(12) United States Patent
Lim et al.

(10) Patent No.: US 8,189,115 B2
(45) Date of Patent: May 29, 2012

(54) IMAGE DEVICE TO REVERSE PLAY WITH MINIMAL TIME DELAY AND A METHOD THEREOF

(75) Inventors: Jeong-eun Lim, Seoul (KR); Kyung-ho Kim, Suwon-si (KR); Bing Ji, Suwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1464 days.

(21) Appl. No.: 11/690,964

(22) Filed: Mar. 26, 2007

(65) Prior Publication Data
US 2008/0055484 A1 Mar. 6, 2008

(30) Foreign Application Priority Data
Sep. 1, 2006 (KR) .................. 10-2006-0084419

(51) Int. Cl.
*H04N 9/64* (2006.01)
(52) U.S. Cl. ........ 348/715; 386/343; 386/344; 386/329; 386/346; 375/240.15; 375/240.25
(58) Field of Classification Search ............ 386/77, 386/224, 243, 326, 346, 344, 329; 375/240.15, 375/240.25
See application file for complete search history.

(56) References Cited

U.S. PATENT DOCUMENTS

| | | | |
|---|---|---|---|
| 6,058,241 A | 5/2000 | Kawamura et al. | |
| 6,201,927 B1* | 3/2001 | Comer | 386/314 |
| 6,233,392 B1 | 5/2001 | Comer | |
| 6,278,835 B1* | 8/2001 | Takiguchi | 386/326 |
| 6,473,558 B1 | 10/2002 | Wu et al. | |
| 6,788,878 B1* | 9/2004 | Fujii et al. | 386/344 |
| 7,924,916 B2* | 4/2011 | Adolph et al. | 375/240.12 |
| 2004/0252970 A1* | 12/2004 | Noh et al. | 386/68 |
| 2005/0078943 A1 | 4/2005 | Kimura | |
| 2006/0088286 A1* | 4/2006 | Shibata et al. | 386/68 |

FOREIGN PATENT DOCUMENTS

| | | |
|---|---|---|
| CN | 1140879 | 1/1997 |
| CN | 1592389 | 3/2005 |
| EP | 1653470 A1 | 5/2006 |
| KR | 2001-69144 | 7/2001 |
| KR | 2004-106823 | 12/2004 |
| WO | 2005/107253 A1 | 11/2005 |
| WO | 2006070514 | 7/2006 |

OTHER PUBLICATIONS

Shimizu et al., A novel decoder-downloadable system for content-oriented coding, Nov. 2002,Global Telecommunications Conference, 2002. GLOBECOM '02. IEEE,1638-1642 vol. 2.*
Partial European Search Report dated Feb. 15, 2011, in European Application No. 07110085.3.
Chinese Office Action issued Aug. 14, 2009 in CN Application No. 2007101051693.
Korea Office Action dated Aug. 17, 2007 issued in KR 2006-84419.
Extended European Search Report issued Jun. 16, 2011, corresponding to European Patent Application No. 07110085.3.

* cited by examiner

*Primary Examiner* — Taghi Arani
*Assistant Examiner* — Amir Mehrmanesh
(74) *Attorney, Agent, or Firm* — Sughrue Mion, PLLC

(57) ABSTRACT

An image device capable of reverse play with minimal time delay, and a method thereof. The image device includes a buffer to store a greater number of pictures than constitute a single group of pictures (GOP), and a controller to operate the buffer to store decoded pictures. Accordingly, problems such as cutoff of pictures or time delays are minimized when performing reverse play.

17 Claims, 10 Drawing Sheets

IMAGE DEVICE TO REVERSE PLAY WITH MINIMAL TIME DELAY AND A METHOD THEREOF

CROSS-REFERENCE TO RELATED APPLICATIONS

This application claims the benefit under 35 U.S.C. §119 (a) from Korean Patent Application No. 10-2006-0084419, filed in the Korean Intellectual Property Office on Sep. 1, 2006, the disclosure of which is incorporated herein in its entirety by reference.

BACKGROUND OF THE INVENTION

1. Field of the Invention

The present general inventive concept relates to an image device capable of reverse play, and a method thereof. More particularly, the present general inventive concept relates to an image device capable of rapid reverse play without cutoff, and a method thereof.

2. Description of the Related Art

Image devices play or record broadcasting, images recorded on recording media, images transmitted from an external device, etc. They have trick play modes including fast forward play, normal forward play, slow forward play, fast reverse play, and reverse play modes.

Image devices which play images compressed in a Motion Picture Experts Group (MPEG) format have many problems when performing reverse play. This results from the types of picture provided in the MPEG format.

The types of picture provided in the MPEG format can be divided into an Intra-coded (I) picture, a Predicted-coded (P) picture and a Bidirectionally predicted-coded (B) picture. The I picture performs discrete cosine transform and decoding of a picture without using motion compensation. The P picture performs motion compensation based on an I picture or another P picture, and then performs discrete cosine transform of the remaining differential. The B picture performs motion compensation similarly to the P picture, but performs motion compensation from two frames positioned at the front and back of a time axis unlike the P picture.

Additionally, a picture transmission sequence in MPEG format has structures like I, P, P, P, P. On the basis of the transmission sequence, a group of pictures (GOP) indicates the pictures from an initial I picture until the next I picture. If the number of pictures in the GOP is set as M, the number of pictures of each GOP in one video sequence varies.

Accordingly, as a GOP can be formed in many ways according to the type and the number of pictures, image devices have difficulty in performing reverse play.

Recently, there has been the problem that only I pictures are reverse-played but other pictures are cut off when performing reverse play. In addition, P pictures as well as I pictures are reverse-played by storing one GOP in a buffer. However, when one GOP is stored in the buffer and reverse-played, if reverse play of the GOP is finished, a previous GOP is decoded, stored in the buffer and then reverse-played, resulting in a time delay.

SUMMARY OF THE INVENTION

The present general inventive concept provides an image device to minimize problems such as cutoff of pictures or time delays when performing reverse play by storing a greater number of pictures that constitute a single GOP in a buffer which stores decoded pictures, and a method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an image device, including a buffer to store more pictures that constitute one group of pictures (GOP), and a controller to control the buffer to store decoded pictures.

The controller may operate the buffer to store a GOP displayed prior to a currently displayed GOP including a picture which is currently displayed.

A number of pictures which the buffer is capable of storing may be the same as a number of pictures constituting two GOPs.

The GOP may include at least one of an intra-coded (I) picture and a predicted-coded (P) picture.

The controller may operate the buffer to include two decoded I pictures among the pictures stored in the buffer.

One of the two decoded I pictures may be included in a GOP, and the other one of the two decoded I pictures may be included in a GOP next to the GOP.

The image device may further include a display unit which displays the pictures stored in the buffer.

A number of pictures constituting the GOP may be a specified constant.

The specified constant may be 15.

The foregoing and/or other aspects and utilities of the present general inventive concept may also be achieved by providing a method of controlling an image device, including decoding a compressed picture, and storing the decoded picture in a buffer which stores more pictures than constitute one GOP.

During the storing operation, a GOP displayed prior to a present GOP including a picture which is currently displayed may be stored in the buffer.

A number of pictures which the buffer is capable of storing may be the same as the number of pictures constituting two GOPs.

The GOP may include at least one of an intra-coded (I) picture and a predicted-coded (P) picture.

In the storing operation, the pictures stored in the buffer may include two decoded I pictures.

One of the two decoded I pictures may be included in a GOP, and the other one of the two decoded I pictures may be included in a GOP next to the GOP.

The method may further include displaying the stored pictures.

The number of pictures constituting the GOP may be a specified constant.

The specified constant may be 15.

The foregoing and/or other aspects and utilities of the present general inventive concept may also be achieved by providing a computer readable recording medium having embodied thereon a computer program to execute a method, wherein the method includes decoding a compressed picture, and storing the decoded picture in a buffer which stores more pictures than constitute one GOP.

The foregoing and/or other aspects and utilities of the present general inventive concept may also be achieved by providing an image device, including a buffer to store one or more decoded I and P pictures of an input MPEG signal, and a controller to control the buffer to output the stored decoded I and P pictures in a predetermined manner.

The image device may include a decoder to decode I, P, and B pictures of an input MPEG signal, and a buffer to selectively store the decoded I and P pictures from the decoded I, P, and B pictures.

The foregoing and/or other aspects and utilities of the present general inventive concept may also be achieved by providing an image device, including a decoder to decode I, P, and B pictures of an input MPEG signal, a buffer to store the decoded I and P pictures, and a controller to control the buffer to output the decoded I and P pictures in a predetermined manner.

The predetermined manner may include a trick play.

The foregoing and/or other aspects and utilities of the present general inventive concept may also be achieved by providing an image device including a decoder to decode a first GOP having I, P, and B pictures and a second GOP having I, P, and B pictures, a buffer to store the decoded I and P pictures of the first and second GOP, and a controller to control the buffer to output the decoded I and P pictures of the first GOP and the second GOP in a predetermined manner.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
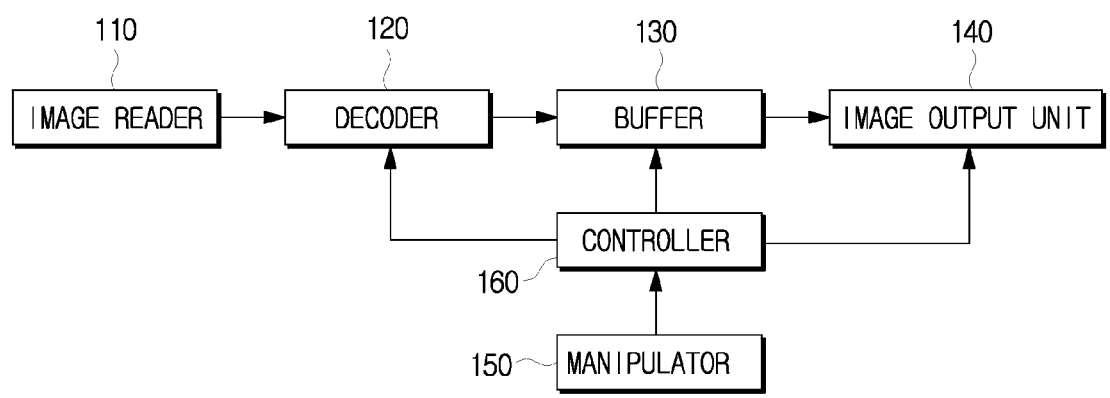
FIG. 1 is a block diagram of an image device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image device according to an embodiment of the present general inventive concept. Referring to FIG. 1, the image device includes an image reader 110, a decoder 120, a buffer 130, an image output unit 140, a manipulator 150 and a controller 160.

The image reader 110 reads compressed pictures recorded on digital video discs (DVDs), hard disc drives (HDD), etc., and transmits them to the decoder 120. The image reader 110 may receive the compressed pictures from an external device, such as DVD players, a HDD, etc.

The decoder 120 decodes the compressed pictures received from the image reader 110 to restore original pictures, and transmits the decoded pictures to the buffer 130. For example, if a picture received from the image reader 110 was compressed using an MPEG format, I pictures are decoded and P pictures are decoded using the I pictures or the I pictures and other P pictures.

The buffer 130 temporarily stores the decoded pictures received from the decoder 120, and the stored pictures are transmitted to the image output unit 140 by the controller 160. The decoded pictures may include the decoded I and/or P pictures. The decoded pictures may include the decoded picture corresponding to B pictures, however, the B pictures may not be included in the decoded pictures to reduce a memory space.

The buffer 130 can store a greater number of pictures that constitute a single group of pictures GOP and may store as many pictures as constitute two GOPs. Generally, the number of pictures constituting a GOP is fixed, but it does not need to be fixed. Moreover, if the number of pictures constituting a GOP is fixed, the GOP may include 15 pictures having I picture, P picture, and/or B picture.

The image output unit 140 outputs the decoded pictures received from the buffer 130 to an internal display unit or an external display unit to display an image corresponding to the decoded pictures. For example, outputting the decoded pictures onto the internal display unit involves a process of displaying pictures received from a display drive unit onto the internal display unit, and outputting the decoded pictures onto the external display unit, such as an external television, involves a process of transmitting pictures received from an image transmission unit to the external display unit. The image output unit 140 may include the internal display unit or may be connected to the internal display unit on the external display unit through a wire or wireless line or network.

The manipulator 150 includes function keys corresponding to trick play functions. The function keys corresponding to the trick play functions may include a continuous forward function key, a step forward function key, a continuous reverse function key, a step reverse function key, etc. The manipulator 150 can be implemented on a display device to be connected to the image output unit 140 to display the image corresponding to the decoded pictures during the trick play function. Additionally, the manipulator 150 can be implemented as a remote control (not illustrated), and a light receiving unit (not illustrated) which receives a manipulation command from a remote control and transmits the command to the controller 160. Furthermore, the manipulator 150 can be implemented with a user interface which receives a command from a user through a menu window.

The controller 160 operates the image reader 110, the decoder 120, the buffer 130 and the image output unit 140 to perform overall functions of the image device. A process of controlling the decoder 120, the buffer 130 and the image output unit 140 by the controller 160 when a user inputs a trick play command using a trick play key is described in detail below.

Figure 2:
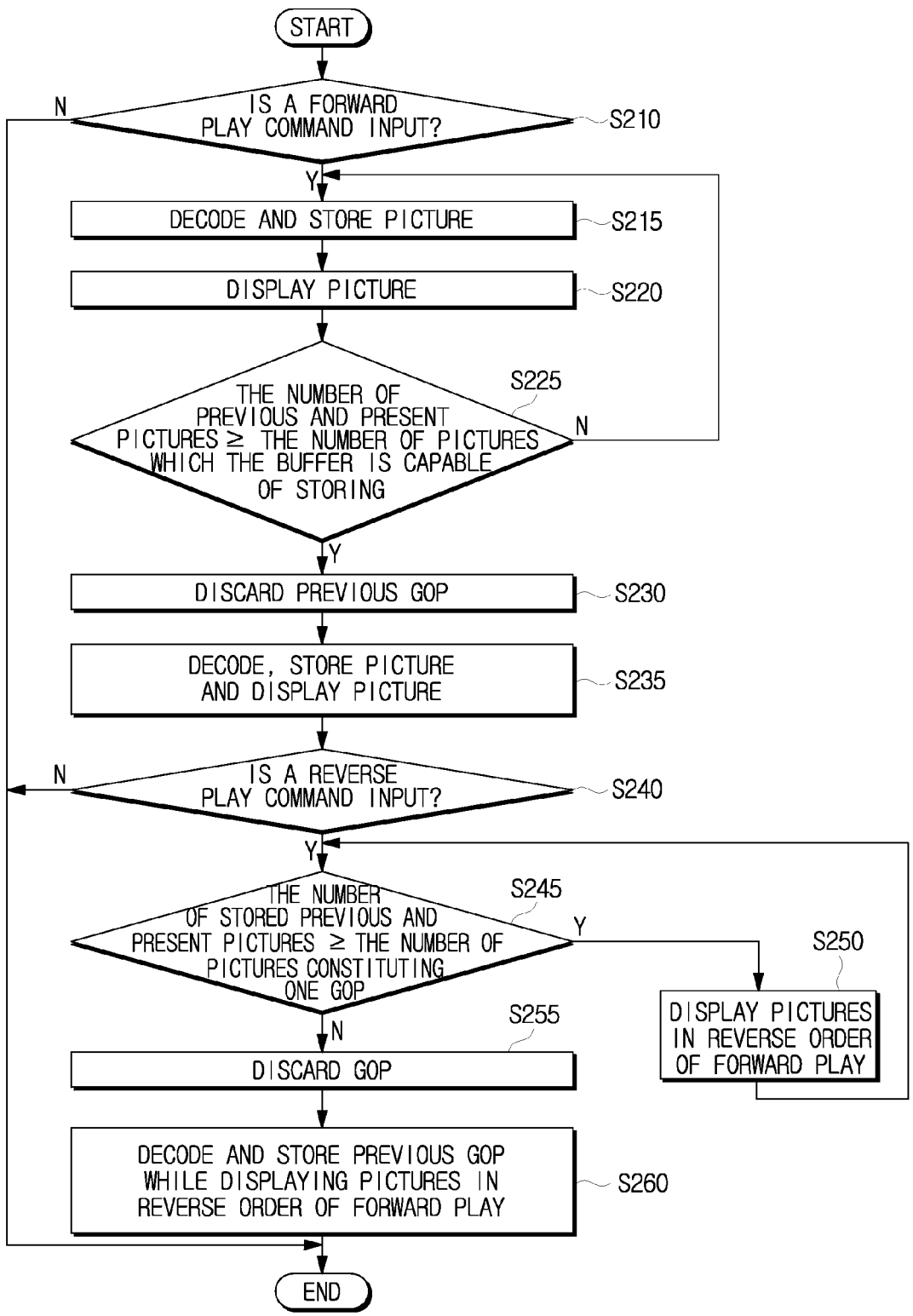
FIG. 2 is a flow chart showing a process of controlling an image device performing forward play and reverse play according to an embodiment of the present general inventive concept.

Hereinbelow, the process of operating the image device of FIG. 1 is described in detail with reference to FIGS. 2 and 3A-3H. FIG. 2 is a flow chart illustrating a process of controlling an image device to perform forward play and reverse play according to an embodiment of the present general inventive concept. FIGS. 3A-3H are provided to further describe detail operations of the flow chart of FIG. 2.

To facilitate the description of the process of operating the image device, it is assumed that an image signal transmitted to the image reader 110 includes 100 GOPs and each GOP includes 15 pictures.

The 100 GOPs are numbered 1st GOP, 2nd GOP, . . . , Nth GOP, . . . , and 100th GOPs. Each GOP has a 1st picture, a 2nd picture, . . . , a Kth picture, . . . , and a 15th picture. The 1st picture may be an I picture and the remaining 14 pictures may be P pictures.

Performing forward play in the image device includes transmitting and displaying one or more GOPs to the image output unit 140 in order, one by one. More specifically, after the pictures in the Nth GOP are displayed in order, the pictures in an N+1th GOP are displayed sequentially. The decoded pictures of the Nth GOP are stored in the buffer 130, all deleted after being outputted to all displayed on the image output unit 140. The decoded pictures of the N+1th GOP can be stored before the pictures of the Nth GOP is deleted in the buffer 130.

Performing reverse play in the image device includes displaying pictures in a reverse order corresponding to the order in which the pictures are displayed during forward play. More specifically, if a reverse play command is input while the Kth picture of the Nth GOP is displayed, the picture to be displayed next is a K−1th picture.

Referring to FIG. 2, the controller 160 determines whether or not a forward play command is input to the image device in operation S210. More specifically, if the user inputs a forward play command using a forward play key provided on the manipulator 150, the controller 160 determines that the forward play command is input.

Figure 3A:
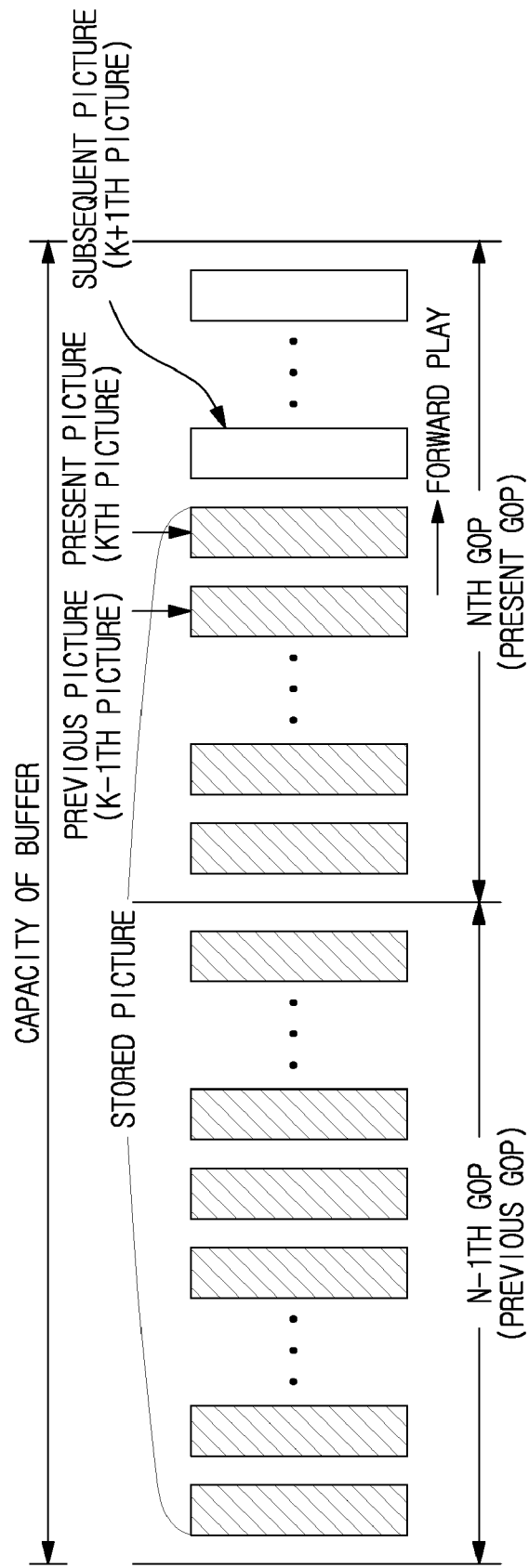
FIGS. 3A-3H are diagrams illustrating detail operations of the flow chart of FIG. 2.

If the forward play command is input in operation S210-Y, the controller 160 operates the decoder 120 to decode pictures transmitted from the image reader 110 to become original signals, and operates the buffer 130 to store the decoded pictures in operation S215. In particular, if a GOP includes an I picture and a P picture, the I picture is decoded and subsequently the P picture is decoded using the I picture or the I picture and another P picture. The decoded pictures are stored in the buffer 130. The stored order follows the decoded order. As illustrated in FIG. 3A, the K−1th picture of the Nth GOP is decoded and stored in the buffer 130, and then the Kth picture is decoded and stored in the buffer 130.

The controller 160 operates the image output unit 140 to display the stored pictures corresponding to the forward play command. As illustrated in FIG. 3A, the controller 160 operates the image output unit 140, so the K−1th picture of the Nth GOP is displayed, and then the Kth picture is displayed.

The picture which is currently displayed, that is, the Kth picture, is referred to as a "present picture," a picture which has been already displayed previously, that is, the K−1th picture and pictures prior to the K−1th picture, is referred to as a "previous picture," and a picture which is yet to be displayed, that is, the K+1th picture and pictures after the K+1th picture, is referred to as a "subsequent picture." The Nth GOP including the Kth picture, the present picture, is referred to as a 'present GOP', a GOP including pictures which have been already displayed, that is, the N−1th GOP and GOPs prior to the N−1th GOP, is referred to as a 'previous GOP', and a GOP including pictures which will be displayed, that is, the N+1th GOP and GOPs after the N+1th GOP, is referred to as a 'subsequent GOP'.

Figure 3B:
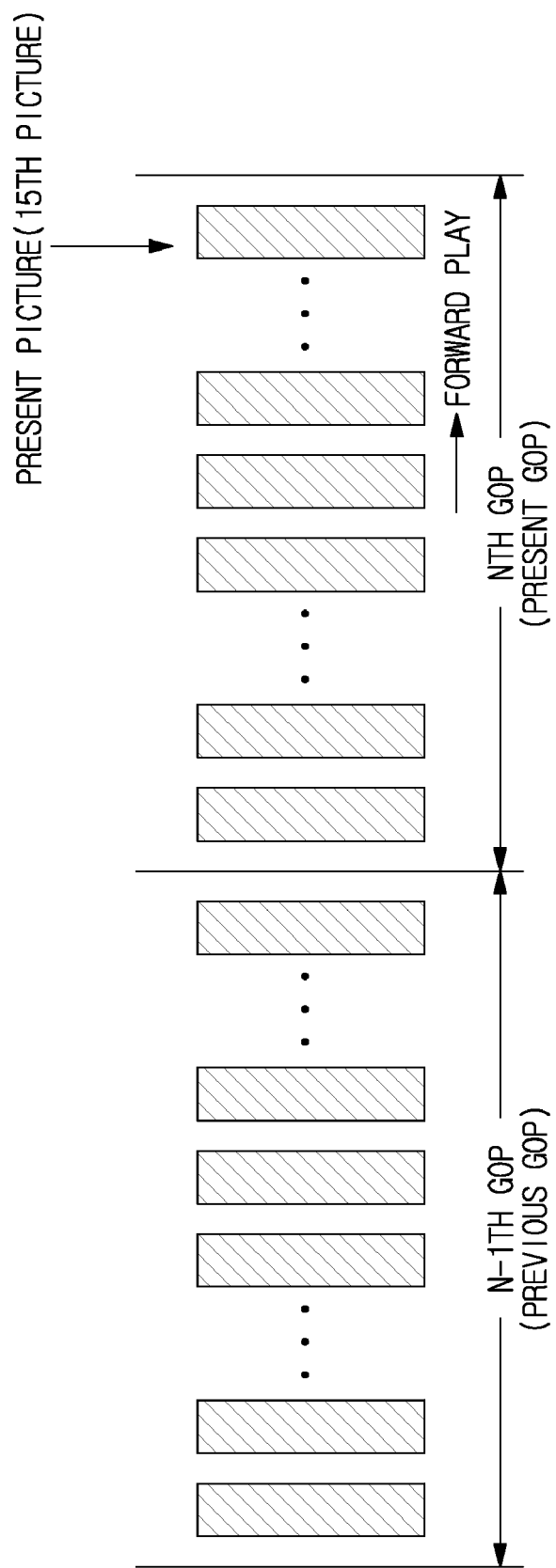

Subsequently, as illustrated in FIG. 3B, the controller 160 determines whether or not the sum of the previous pictures and the present picture is equal to or greater than a number of pictures which the buffer 130 is capable of storing in operation S225. If a number of pictures which are stored in the buffer 130, and which have been already displayed or are currently being displayed is equal to or greater than the number of pictures which the buffer 130 is capable of storing, the controller 160 performs the following operation because the decoder 120 cannot store any more decoded pictures.

Figure 3C:
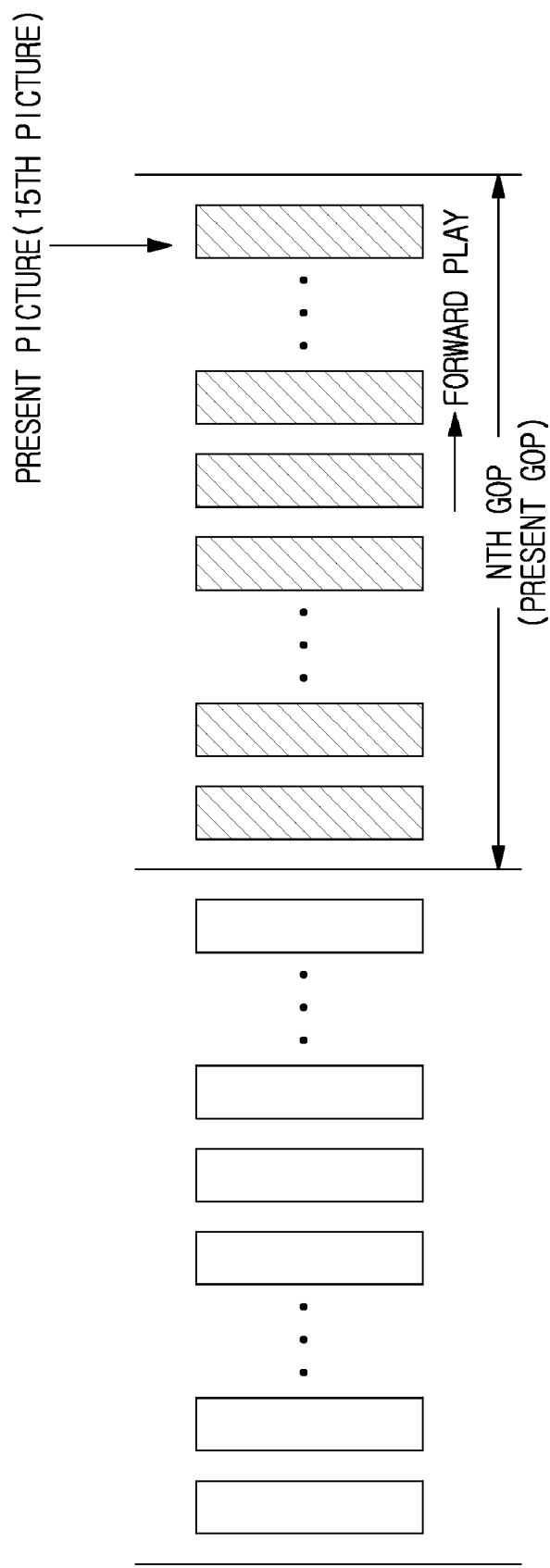

If the number of the previous pictures and the present picture (that is, pictures which are stored in the buffer 130, and which have been already displayed or are currently being displayed) is equal to or greater than the number of pictures which the buffer 130 is capable of storing in operation S225-Y, the controller 160 discards the N−1th GOP from the buffer 130 in operation S230 as illustrated in FIG. 3C.

Figure 3D:
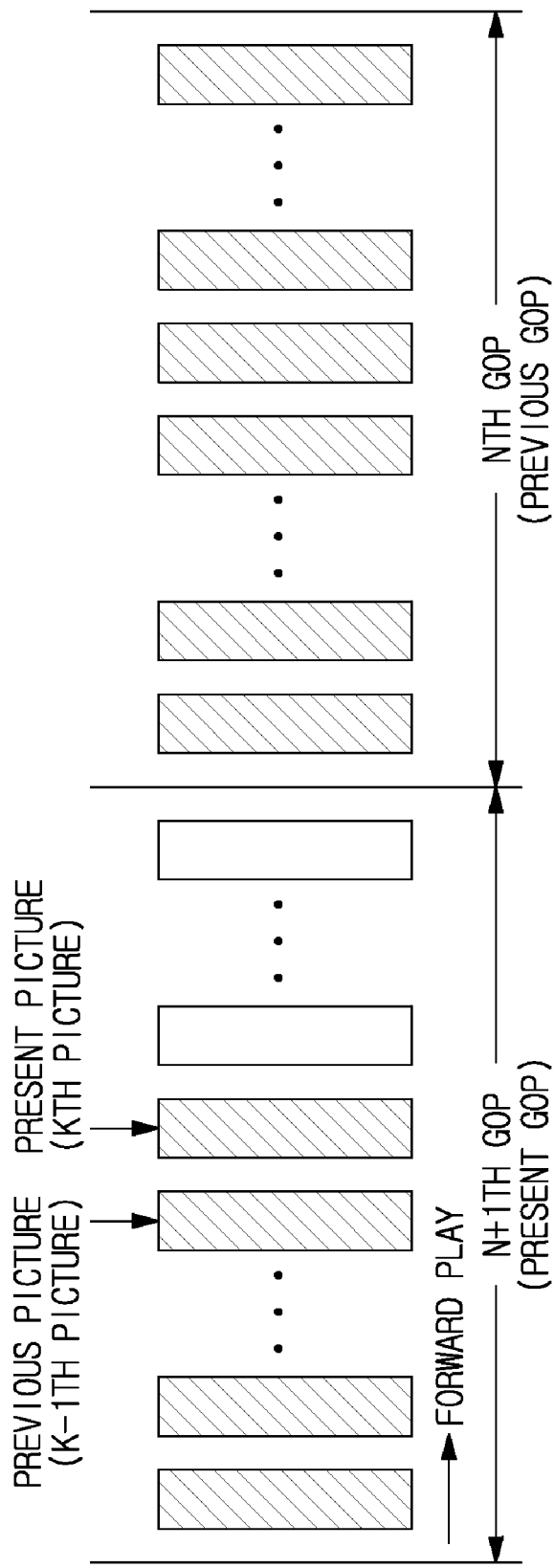

Subsequently, as illustrated in FIG. 3D, the controller 160 operates the decoder 120 to decode pictures constituting the N+1th GOP, and operates the buffer 130 to store the decoded pictures. The controller 160 operates the display unit to display the stored pictures in operation S235.

The controller 160 determines whether or not a reverse play command is input while displaying the pictures according to the forward play command in operation S240. If the user inputs a reverse play command to display pictures in a reverse order corresponding to an order during forward play, using a reverse play key provided on the manipulator 150, the controller 160 determines that the reverse play command is input.

If the reverse play command is input in operation S240-Y, the controller 160 determines if the number of pictures which are stored in the buffer 130 is equal to or greater than a number of pictures constituting one GOP in operation S245.

If the number of previous and present pictures which are stored in the buffer 130 is equal to or greater than the number of pictures constituting one GOP in operation S245-Y, the controller 160 displays pictures corresponding to the reverse play command.

Figure 3E:
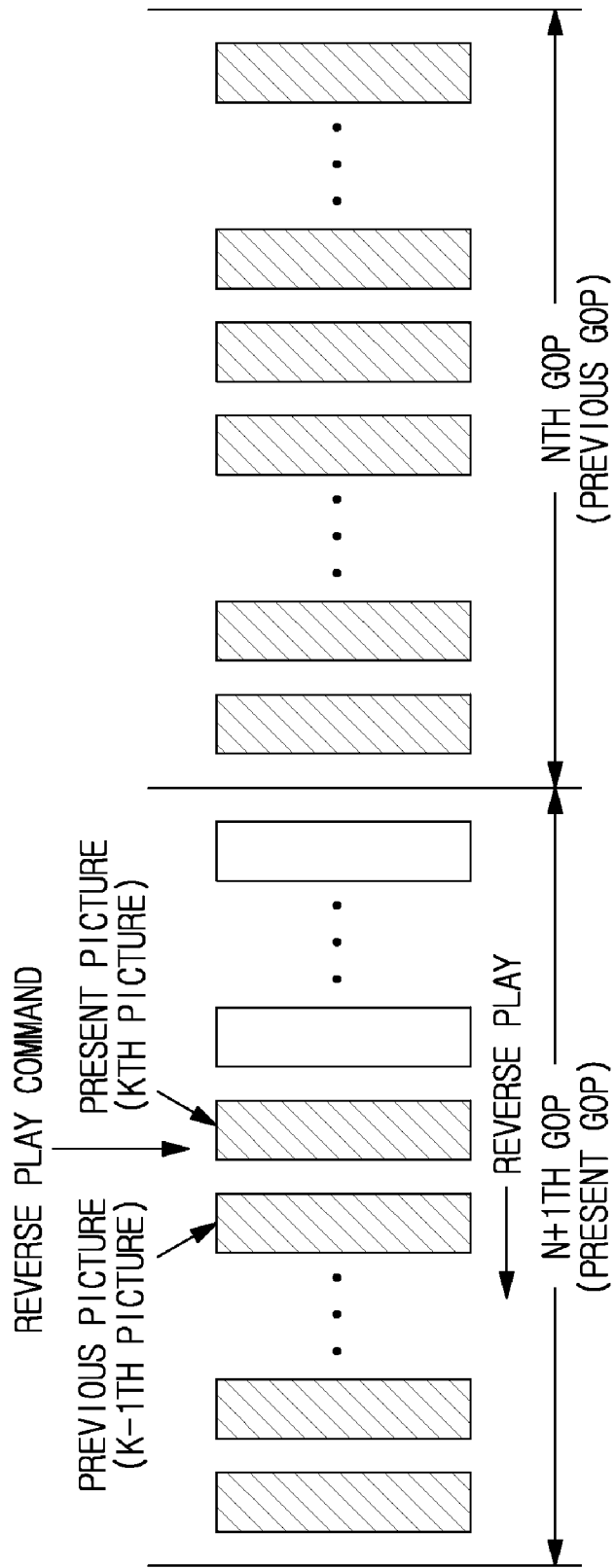
Figure 3F:
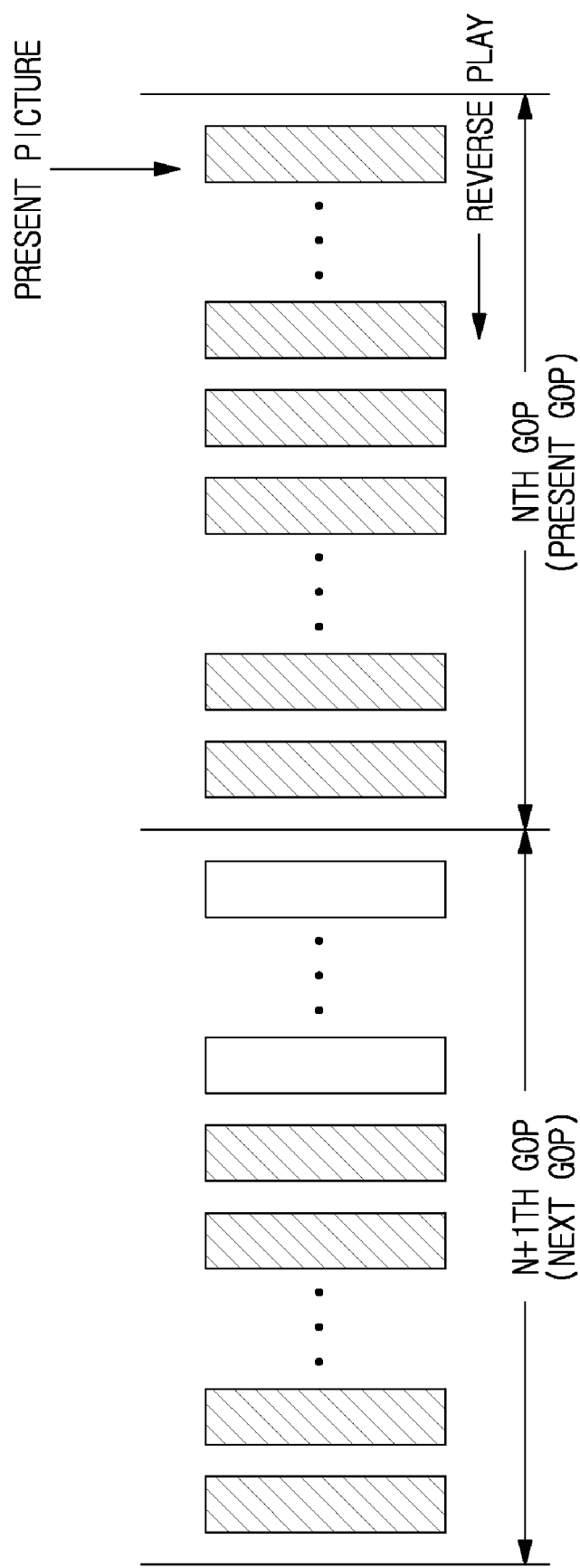

As illustrated in FIG. 3E, if the user inputs the reverse play command while the Kth picture of the N+1th GOP is displayed, the controller 160 determines that the number of previous and present pictures which are stored in the buffer 130 is equal to or greater than the number of pictures constituting one GOP because the buffer 130 stores pictures constituting the Nth GOP, and the 1st to the Kth pictures of the N+1th GOP. Accordingly, the controller 160 displays the Kth picture and then pictures prior to the Kth picture without operating the decoder 120.

Also, the Kth picture displayed by reverse play (that is, the 1st of the Nth GOP in FIG. 3F) is a picture to be displayed based on the position of a picture which is currently displayed (that is, the 15th picture of the Nth GOP) if the user inputs a forward play command, and thus is referred to as a subsequent picture. A GOP including such pictures is regarded as a subsequent GOP.

Figure 3G:
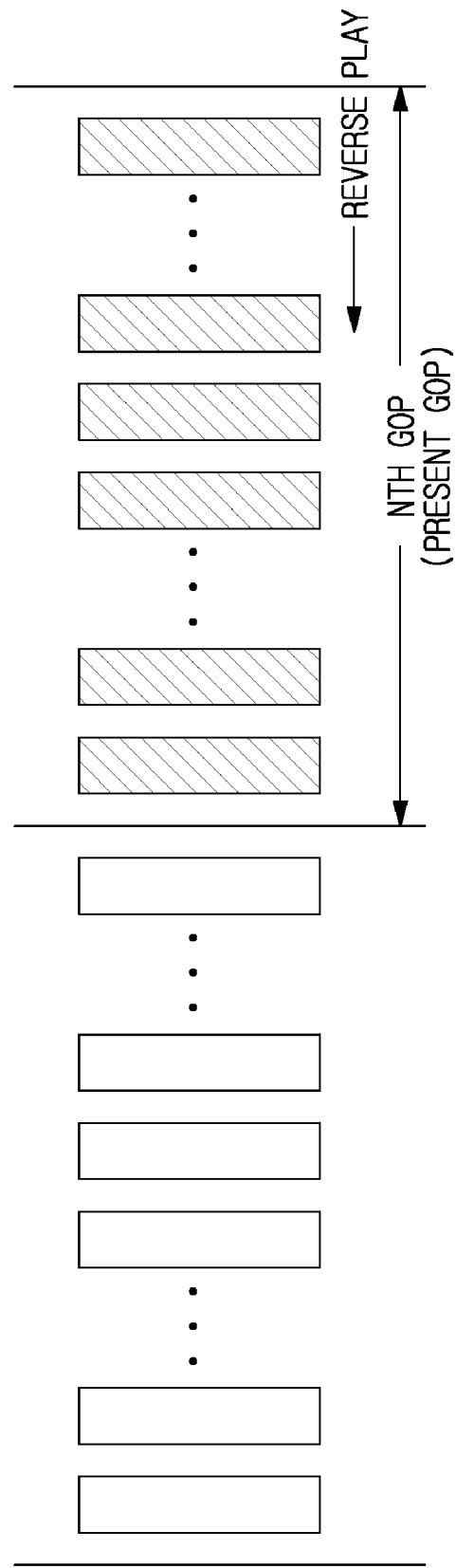

Alternatively, if the number of previous and present pictures which are stored in the buffer 130 is not equal to or greater than the number of pictures constituting one GOP in operation S245-N, the controller 160 discards the GOP including the reverse-played pictures, that is, the N+1th GOP from the buffer 130 as illustrated in FIG. 3G. in operation S255.

Figure 3H:
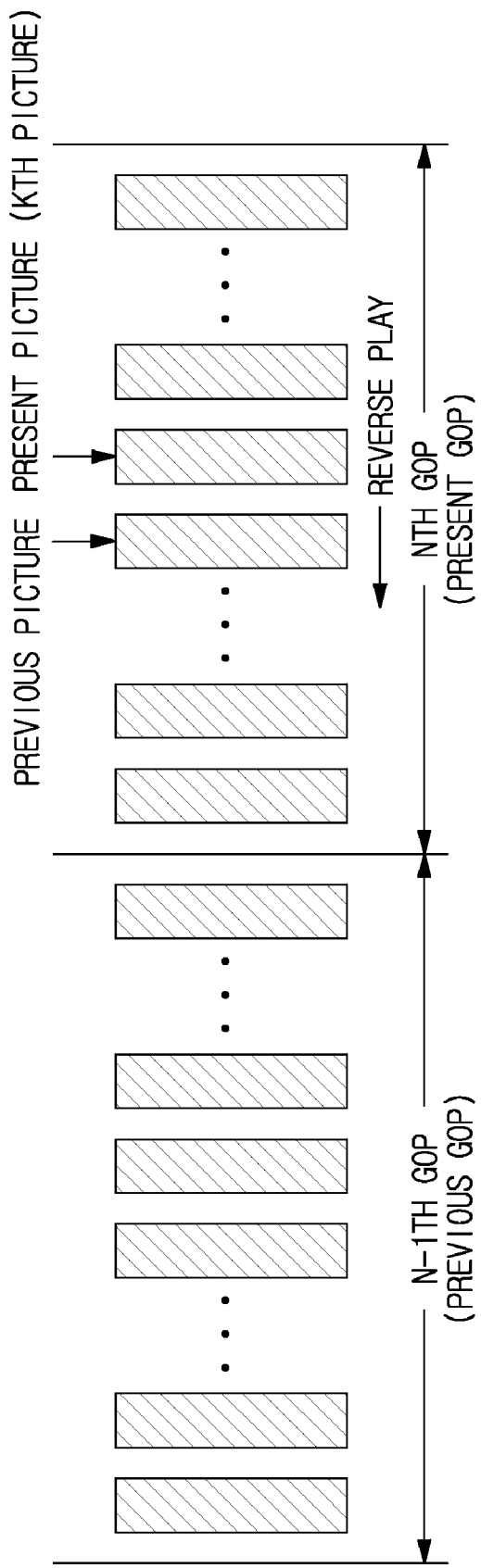

As illustrated in FIG. 3H, the controller 160 is operated to store a previous GOP, that is, the N−1th GOP instead of the discarded N+1th GOP. More specifically, the controller 160 operates the decoder 120 to decode the N−1th GOP, and operates the buffer 130 to store the decoded N−1th GOP. While the pictures corresponding to the N−1th GOP are decoded and stored, the controller 160 operates to display the pictures corresponding to the Nth GOP in operation S260.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, the buffer 130 stores pictures equal to or greater than the number of pictures constituting one GOP. Accordingly, while pictures are displayed, the buffer 130 always stores previous pictures. Consequently, if pictures are reverse-played, cutoff of displayed pictures or delay of displaying pictures is prevented.

In FIG. 2, the controller 160 is described as a component which decodes, stores and directly displays pictures, but it is not limited hereto. For example, the controller 160 may decode, store and display pictures in a GOP unit. Accordingly, a picture to be displayed, that is, a subsequent picture, can be stored in the buffer 130.

A plurality of trick play modes include a continuous forward play mode and step forward play mode. The continuous forward play mode displays subsequent pictures continuously without additional input if a user inputs forward play. The step play mode displays subsequent pictures according to additional input by a user. In both trick play modes, a method of decoding and storing pictures is the same.

An embodiment in which one GOP constitutes a fixed number of pictures is described in FIG. 2, but the number of pictures constituting one GOP is not necessarily fixed. Even though the number of pictures constituting one GOP is not fixed, if the above described method is applied, the number of pictures which the buffer 130 is capable of is also not necessarily fixed.

The image device according to an embodiment of the present general inventive concept discloses the image reader 110 to read images, but can also receive and display images stored in an external device.

As can be appreciated from the above description of an image device to store more pictures than constitute a single GOP in a buffer which stores decoded pictures, cutoff of pictures or time delay is minimized when performing reverse play.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image device, comprising:
    a buffer for storing a number of pictures constituting two groups of pictures (GOPs) and stores at least one group of pictures (GOP) comprising decoded pictures;
    a controller to control the buffer to discard or store a GOP based on a number of pictures which are stored in the buffer in a predetermined manner, wherein the at least one GOP comprises a current GOP and a previous GOP;
    wherein the current GOP comprises a current picture which is currently being displayed, and the previous GOP comprises pictures which were decoded and displayed previous to the current GOP;
    wherein the controller determines a first number which is a sum of a number of pictures which are stored in the buffer and currently being displayed, and a number of pictures which are stored in the buffer and were previously displayed;
    wherein if the controller determines that the first number is equal to or greater than a second number of pictures that the buffer has previously stored, the controller controls the buffer to discard the previous GOP from the buffer and store a next GOP in the buffer; and
    wherein the next GOP comprises pictures to be displayed after the pictures in the current GOP.

2. The image device of claim 1, wherein the predetermined manner comprises a trick play.

3. The image device of claim 1, wherein the at least one GOP comprises at least one decoded intra-coded (I) picture.

4. The image device of claim 1, further comprising: a display unit which displays the pictures stored in the buffer.

5. The image device of claim 1, wherein a number of pictures constituting each of the at least one GOP is a specified constant.

6. The image device of claim 5, wherein the specified constant is 15.

7. The image device of claim 1, wherein the controller determines the first number, and, if the first number is equal to or greater than the second number, controls the buffer to discard the previous GOP from the buffer and store a next GOP in the buffer, when the current picture in the current GOP is currently being displayed in a forward play mode.

8. The image device of claim 7, wherein, if the forward play mode is changed to a reverse play mode while the current picture in the current GOP is currently being displayed in the forward play mode, the controller determines a third number which is a sum of a number of pictures which are stored in the buffer and are currently being displayed, and a number of pictures which are stored in the buffer and were previously displayed in the forward play mode,
    wherein if the controller determines that the third number is equal to or less than a set number of pictures constituting one GOP, the controller controls the buffer to discard the next GOP, comprising the pictures which were displayed in the reverse play mode, from the buffer, and store the previous GOP.

9. A method of controlling an image device, comprising:
    decoding compressed pictures; and
    storing at least one group of pictures (GOP) comprising the decoded pictures in a buffer for storing a number of pictures constituting two groups of pictures (GOPs);
    controlling the buffer to discard or store a GOP based on a number of pictures which are stored in the buffer in a predetermined manner;
    wherein the at least one GOP comprises a current GOP and a previous GOP, and wherein the current GOP comprises a current picture which is currently being displayed, and the previous GOP comprises pictures which were decoded and displayed previous to the current GOP;
    wherein the method further comprises:
    determining a first number which is a sum of a number of pictures which are stored in the buffer and currently being displayed, and a number of pictures which are stored in the buffer and were previously displayed, if it is determined that the first number is equal to or greater than a second number of pictures that the buffer has previously stored, controlling the buffer to discard the previous GOP from the buffer and store a next GOP in the buffer; and
    wherein the next GOP comprises pictures to be displayed after the pictures in the current GOP.

10. The method of claim 9, wherein the predetermined manner comprises a trick play.

11. The method of claim 9, wherein the at least one GOP comprises at least one decoded intra-coded (I) picture.

12. The method of claim 9, further comprising displaying the stored pictures.

13. The method of claim 9, wherein a number of pictures constituting each of the at least one GOP is a specified constant.

14. The method of claim 13, wherein the specified constant is 15.

15. The method of claim 9, wherein the determining the first number and the controlling the buffer to discard the previous GOP from the buffer and store a next GOP in the buffer if the first number is equal to or greater than the second number is performed when the current picture in the current GOP is currently being displayed in a forward play mode.

16. The method of claim 15, further comprising:
if the forward play mode is changed to a reverse play mode while the current picture in the current GOP is currently being displayed in a forward play mode, determining a third number which is a sum of a number of pictures which are stored in the buffer and are currently being displayed, and a number of pictures which are stored in the buffer and were previously displayed in the forward play mode; and
if it is determined that the third number is equal to or less than a set number of pictures constituting one GOP, controlling the buffer to discard the next GOP, comprising the pictures which were displayed in the reverse play mode, from the buffer, and store the previous GOP.

17. A non-transitory computer readable recording medium having embodied thereon a computer program to execute a method, wherein the method comprises:
decoding compressed pictures;
storing in a buffer for storing a number of pictures constituting two groups of pictures (GOPs), at least one group of pictures (GOP) comprising the decoded pictures;
controlling the buffer to discard or store a GOP based on a number of pictures which are stored in the buffer in a predetermined manner;
wherein the at least one GOP comprises a current GOP and a previous GOP, and wherein the current GOP comprises a current picture which is currently being displayed, and the previous GOP comprises pictures which were decoded and displayed previous to the current GOP;
wherein the method further comprises:
determining a first number which is a sum of a number of pictures which are stored in the buffer and currently being displayed, and a number of pictures which are stored in the buffer and were previously displayed, and if it is determined that the first number is equal to or greater than a second number of pictures that the buffer has previously stored, controlling the buffer to discard the previous GOP from the buffer and store a next GOP in the buffer; and
wherein the next GOP comprises pictures to be displayed after the pictures in the current GOP.

* * * * *